（12) United States Patent
Li et al.

(10) Patent No.: US 11,418,781 B2
(45) Date of Patent: Aug. 16, 2022

(54) FLEXIBLE TREE STRUCTURE

(71) Applicant: TENCENT AMERICA LLC, Palo Alto, CA (US)

(72) Inventors: Xiang Li, San Jose, CA (US); Shan Liu, San Jose, CA (US); Xin Zhao, San Jose, CA (US); Jing Ye, San Jose, CA (US); Liang Zhao, Sunnyvale, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 44 days.

(21) Appl. No.: 16/918,605

(22) Filed: Jul. 1, 2020

(65) Prior Publication Data

US 2020/0336741 A1 Oct. 22, 2020

Related U.S. Application Data

(63) Continuation of application No. 16/234,116, filed on Dec. 27, 2018, now Pat. No. 10,735,730.

(Continued)

(51) Int. Cl.
*H04N 19/119* (2014.01)
*G06F 16/71* (2019.01)
(Continued)

(52) U.S. Cl.
CPC ........... *H04N 19/119* (2014.11); *G06F 16/71* (2019.01); *H04N 19/136* (2014.11); *H04N 19/176* (2014.11); *H04N 19/96* (2014.11)

(58) Field of Classification Search
None
See application file for complete search history.

(56) References Cited

U.S. PATENT DOCUMENTS 10,735,730 B2 * 8/2020 Li .................. H04N 19/136
2017/0150183 A1 * 5/2017 Zhang ............... H04N 19/587
(Continued)

FOREIGN PATENT DOCUMENTS

WO     2017090967 A1    6/2017
WO     2017/157249 A1   9/2017

OTHER PUBLICATIONS

Communication dated Sep. 7, 2021 by the Japanese Patent Office in application No. 2020-546102.
(Continued)

*Primary Examiner* — Christopher G Findley
(74) *Attorney, Agent, or Firm* — Sughrue Mion, PLLC

(57) ABSTRACT

A method and apparatus for partitioning a block to permit the encoding or decoding of a video sequence includes partitioning the block using a split-to-square partition pattern, a horizontal binary tree partition pattern, or a horizontal ternary tree partition pattern to generate a set of sub-blocks, wherein a same priority is allocated to the split-to-square partition pattern, the horizontal binary tree partition pattern, and the horizontal ternary tree partition pattern such that the split-to-square partition pattern may be used before, after, or interleaved with the horizontal binary tree partition pattern and the horizontal ternary tree partition pattern. Encoding or decoding the video sequence is performed based on partitioning the block using the split-to-square partition pattern, the horizontal binary tree partition pattern, or the horizontal ternary tree partition pattern.

20 Claims, 7 Drawing Sheets

Related U.S. Application Data

(60) Provisional application No. 62/639,989, filed on Mar. 7, 2018.

(51) Int. Cl.
    *H04N 19/96* (2014.01)
    *H04N 19/136* (2014.01)
    *H04N 19/176* (2014.01)

(56) References Cited

U.S. PATENT DOCUMENTS

| | | | |
|---|---|---|---|
| 2017/0208336 A1* | 7/2017 | Li | H04N 19/105 |
| 2017/0272782 A1 | 9/2017 | Li et al. | |
| 2019/0075328 A1* | 3/2019 | Huang | H04N 19/134 |

OTHER PUBLICATIONS

Li et al., "Multi-Type-Tree", Qualcomm Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, Document: JVET-D0117rl, XP030247451 (3 pages total).

Coban et al., "AMP mode support for minimum CDs of size greater than 8×8", Qualcomm Inc., Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCTVC-J0278, XP030112640 (14 pages total).

Ma et al., "Description of Core Experiment: Partitioning", CE coordinators, Joint Video Exploration Team (JVET) of ITU-T SG 16 WP 3 and ISO/IEC JTC 1/SC 29/WG 11, 10th Meeting: San Diego. US, Apr. 10-20, 2018, Document: JVET-J1021-r5, XP030262213 (33 pages total).

International Search Report dated May 3, 2019 from the International Searching Authority in International Application No. PCT/US2019/020866.

Written Opinion dated May 3, 2019 from the International Searching Authority in International Application No. PCT/US2019/020866.

Extended European Search Report dated Mar. 29, 2021 from the European Patent Office in EP Application No. 19765017.9.

Communication dated Apr. 15, 2021 from the European Patent Office in EP Application No. 19765017.9.

* cited by examiner

FIG. 5    Encoder 303

FLEXIBLE TREE STRUCTURE

CROSS-REFERENCE TO RELATED APPLICATION

This is a continuation application of U.S. application Ser. No. 16/234,116, filed on Dec. 27, 2018, which claims benefit of U.S. Application No. 62/639,989, filed on Mar. 7, 2018, in the United States Patent & Trademark Office, the disclosures of which are incorporated herein by reference in their entireties.

FIELD

This disclosure is related to advanced block partitioning in hybrid video coding beyond HEVC. More specifically, a flexible tree structure is proposed for efficient block partitioning.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology with a compression capability that significantly exceeds that of the HEVC standard (including its extensions). The groups are working together on this exploration activity in a joint collaboration effort known as the Joint Video Exploration Team (JVET) to evaluate compression technology designs proposed by their experts in this area. A Joint Exploration Model (JEM) has been developed by JVET to explore the video coding technologies beyond the capability of HEVC, and the current latest version of JEM is JEM-7.0.

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two, or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of the key features of the HEVC structure is that it has the multiple partition conceptions including CU, PU, and TU. In HEVC, a CU or a TU can only be square shaped, while a PU may be square or rectangular shaped for an inter predicted block. In later stages of HEVC, some contributions proposed to allow rectangular shaped PUs for intra prediction and transformation. These proposals were not adopted to HEVC but extended to be used in JEM. At the picture boundary, HEVC imposes implicit quad-tree split so that a block will keep quad-tree splitting until the size fits the picture boundary.

Inspired by previous works, a Quad-tree-Binary-tree (QTBT) structure was developed and unifies the concepts of the CU, PU, and TU and supports more flexibility for CU partitioned shapes. In the QTBT block structure, a CU can have either a square or rectangular shape. A coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU, and TU have the same block size in the QTBT coding block structure. In JEM, a CU sometimes consists of coding blocks (CBs) of different colour components, e.g., one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme:
CTU size: the root node size of a quadtree, the same concept as in HEVC
MaxQTDepth: the maximum allowed quad-tree depth
MinQTSize: the minimum allowed quadtree leaf node size
MaxBTSize: the maximum allowed binary tree root node size
MaxBTDepth: the maximum allowed binary tree depth
MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Multi-type-tree (MTT) structure is a more flexible tree structure than QTBT. In MTT, tree types other than quadtree and binary-tree are supported. For example, horizontal and vertical center-side triple-trees are introduce. Further, MTT supports (a) quad-tree partitioning, (b) vertical binary-tree partitioning, (c) horizontal binary-tree partitioning, (d) vertical center-side triple-tree partitioning, (e) horizontal center-side triple-tree partitioning, among other types.

There are two levels of trees, region tree (quad-tree) and prediction tree (binary-tree or triple-tree). A CTU is firstly partitioned by region tree (RT). A RT leaf may be further split with prediction tree (PT). A PT node may also be further split with PT until a max PT depth is reached. After entering PT, RT (quad-tree) cannot be used anymore. A PT leaf is the basic coding unit. It is still called CU for convenience. A CU cannot be further split. Prediction and transform are both applied on CU in the same way as JEM-3 or QTBT.

The key benefits of the triple-tree partitioning are to complement quad-tree and binary-tree partitioning: triple-tree partitioning is able to capture objects which are located in a block center, while quad-tree and binary-tree are always splitting along the block center. Further, the width and height of the partitions of the proposed ternary trees are always a power of two so that no additional transforms are needed.

The design of the two-level tree is mainly motivated by complexity reduction. Theoretically, the complexity of traversal of a tree is $T^D$, where T denotes the number of split types, and D is the depth of tree. With the design of a two level tree and by restricting the first level to quad-tree only (e.g., reduce the number of Tat certain levels), the complexity is significantly while maintaining reasonable performance.

To further improve the coding efficiency on top of QTBT, an asymmetric binary tree is proposed. For example, a coding unit with size S is divided into 2 sub-CU with sizes S/4 and S/4, either in the horizontal or in the vertical direction. In practice the added available CU sizes are 12 and 24. In a further extended version of the tool, CU sizes 6 and 48 may be allowed.

One major issue with this method is that it is inconvenient if width/height of a block is not a power of two. For example, transforms with sizes such as 12 and 24 need to be supported. Special handling may also be needed when splitting a block with width/height other than a power of 2.

SUMMARY

According to an aspect of the disclosure, a method for partitioning a block to permit the encoding or decoding of a video sequence includes partitioning the block using a split-to-square partition pattern, a horizontal binary tree partition pattern, or a horizontal ternary tree partition pattern to generate a set of sub-blocks, wherein a same priority is allocated to the split-to-square partition pattern, the horizontal binary tree partition pattern, and the horizontal ternary tree partition pattern such that the split-to-square partition pattern may be used before, after, or interleaved with the horizontal binary tree partition pattern and the horizontal ternary tree partition pattern; and encoding or decoding the video sequence based on partitioning the block using the split-to-square partition pattern, the horizontal binary tree partition pattern, or the horizontal ternary tree partition pattern.

According to an aspect of the disclosure, a method for partitioning a block to permit the encoding or decoding of a video sequence includes partitioning the block using a split-to-square partition pattern to generate a set of sub-blocks, wherein if the block is square, then each sub-block is square, and wherein if the block is non-square, then each sub-block includes a same size that is a greatest common factor of a width and a height of the block; encoding or decoding the video sequence based on partitioning the block using the split-to-square partition pattern.

According to an aspect of the disclosure, a device for partitioning a block to permit the encoding or decoding of a video sequence includes at least one memory configured to store program code; at least one processor configured to read the program code and operate as instructed by the program code, the program code including: partitioning code configured to cause the at least one processor to partition the block using a split-to-square partition pattern, a horizontal binary tree partition pattern, or a horizontal ternary tree partition pattern to generate a set of sub-blocks, wherein a same priority is allocated to the split-to-square partition pattern, the horizontal binary tree partition pattern, and the horizontal ternary tree partition pattern such that the split-to-square partition pattern may be used before, after, or interleaved with the horizontal binary tree partition pattern and the horizontal ternary tree partition pattern; and encoding or decoding code configured to cause the at least one processor to encode or decode the video sequence based on partitioning the block using the split-to-square partition pattern, the horizontal binary tree partition pattern, or the horizontal ternary tree partition pattern.

According to an aspect of the disclosure, a non-transitory computer-readable medium storing instructions, the instructions comprising: one or more instructions that, when executed by one or more processors of a device for partitioning a block to permit the encoding or decoding of a video sequence, cause the one or more processors to: partition the block using a split-to-square partition pattern, a horizontal binary tree partition pattern, or a horizontal ternary tree partition pattern to generate a set of sub-blocks, wherein a same priority is allocated to the split-to-square partition pattern, the horizontal binary tree partition pattern, and the horizontal ternary tree partition pattern such that the split-to-square partition pattern may be used before, after, or interleaved with the horizontal binary tree partition pattern and the horizontal ternary tree partition pattern; and encode or decoe the video sequence based on partitioning the block using the split-to-square partition pattern, the horizontal binary tree partition pattern, or the horizontal ternary tree partition pattern.

BRIEF DESCRIPTION OF THE DRAWINGS

Further features, the nature, and various advantages of the disclosed subject matter will be more apparent from the following detailed description and the accompanying drawings in which.

PROBLEM TO BE SOLVED

The two-level MTT tree structure is an unbalanced framework. As QT is not allowed after BT/TT nodes, the overall depth may be much smaller for a tree starting from BT/TT than a tree starting from QT. Such an unbalanced tree design introduces problems for parallel encoding such as multi-threading at depth 0 level at the encoder side since multi-threading will not help if one subtree occupies most of the encoding time.

The current design may degrade coding performance in some special cases. For example, in 4:2:2 chroma format, if a square luma CTU is used, a non-square chroma CTU occurs accordingly. In this way, significant computational expense is introduced.

HEVC implicit QT splitting is not efficient if flexible tree structures like MTT are used since, sometimes, too small blocks must be selected by implicit split.

DETAILED DESCRIPTION

Figure 1:
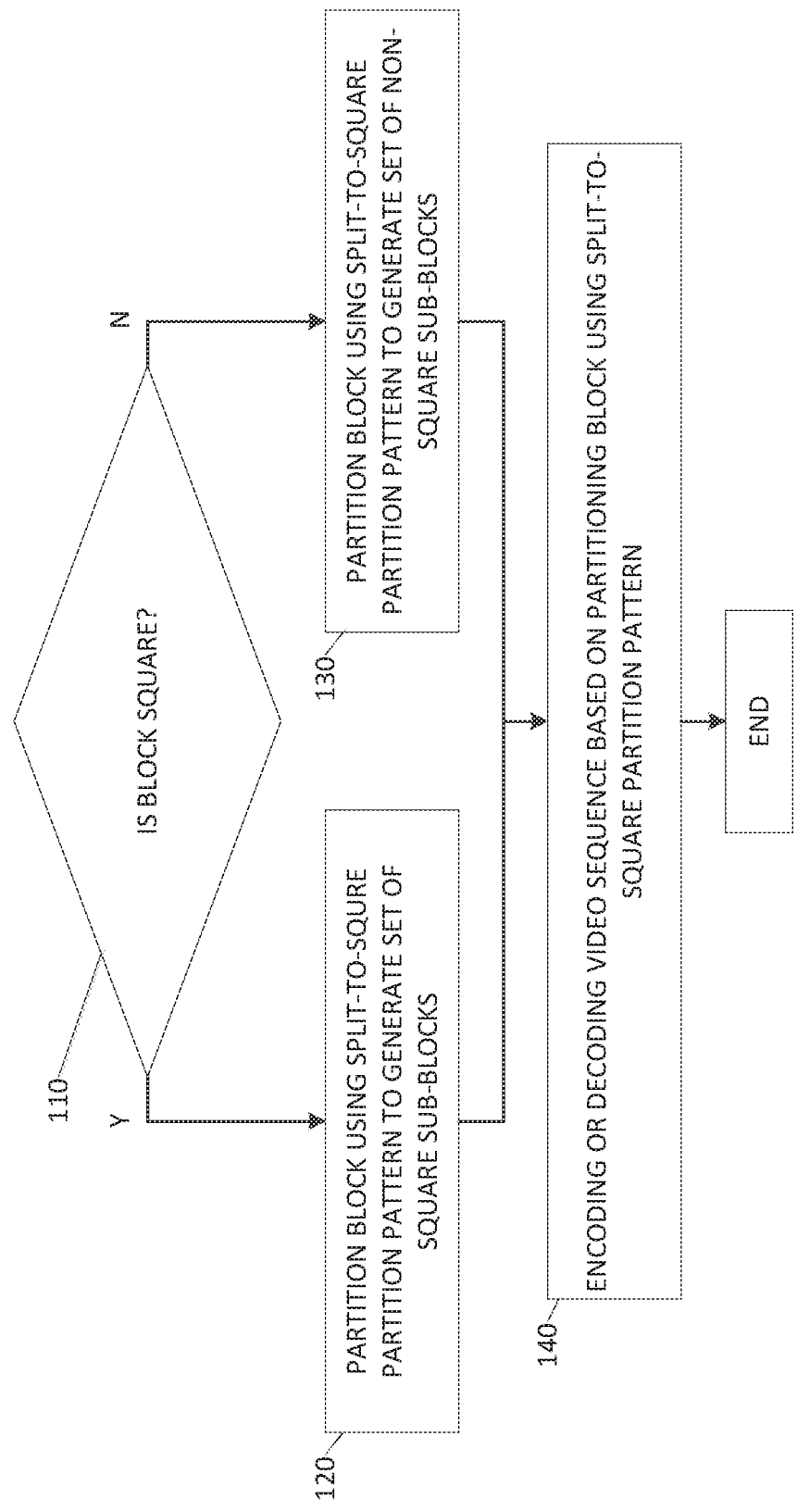
FIG. 1 is a flowchart of an example process for partitioning a block using a split-to-square partition pattern to generate a set of sub-blocks.

FIG. 1 is a flowchart of an example process for partitioning a block using a split-to-square partition pattern to generate a set of sub-blocks.

In some implementations, one or more process blocks of FIG. 1 may be performed by a decoder. In some implementations, one or more process blocks of FIG. 1 may be performed by another device or a group of devices separate from or including a decoder, such as an encoder.

As shown in FIG. 1, a process may include determining whether a block is square (block 110). If the block is square (block 110—YES), then the process may include partitioning the block using a split-to-square partition pattern to generate a set of sub-blocks (block 120). In this case, each sub-block is square. Alternatively, if the block is non-square (block 110—NO), then the process may include partitioning the block using a split-to-square partition pattern to generate a set of non-square sub-blocks (block 130). In this case, each sub-block includes a same size that is a greatest common factor of a width and height of the block. As further shown in FIG. 1, the process may include encoding or decoding the video sequence based on partitioning the block using the split-to-square partition pattern (block 140).

According to an embodiment, it is proposed to change the quad-tree split to split-to-square. If the block to be split is square, the split-to-square has the same effect as the quad-tree split. Otherwise, the block is split into same-size square sub-blocks whose width/height is the greatest common factor of the width and height of the block. For example, an 8×32 block is split into four 8×8 block with split-to-square.

According to an embodiment, the maximal number of sub-blocks may be constrained by pre-definition or signaling. It may be signaled in the sequence parameter set (SPS), picture parameter set (PPS), slice header, CTU header, tile header, or for a region of a picture. According to an embodiment, the maximum number of sub-blocks may be 4, 8, 16, or the like. When the maximum number of sub-blocks, pre-defined or signaled is conflict to the split-to-square signaling, for example, the split-to-square signaling indicates split-to-square for a 64×8 block, while the maximum number of sub-blocks is equal to 4, then in one embodiment, the split-to-square flag is overwritten and the 64×8 block is not further split-to-square. In another embodiment, when this situation happens, the bitstream is considered as a non-conforming bitstream.

To avoid the duplication with other split types, such as binary tree, split-to-square or other split types are disallowed under certain conditions. When a partition or split is not allowed, the signaling of this partition or split may be eliminated. In this case, the related signaling may be conditionally skipped.

Split-to-square is disallowed if there are two sub-blocks (both luma and chroma has two sub-blocks) after a split-to-square, and related binary tree is also allowed at the same time. For example, for a 16×8 block both split-to-square and vertical binary split lead to two 8×8 sub-blocks. In this case, split-to-square is not allowed so that the signal of split-to-square for the 16×8 block is skipped and split-to-square flag is derived as false.

Either split-to-square or vertical binary split is disallowed if the two lead to the same sub-block partitioning after split. Either split-to-square or horizontal binary split is disallowed if the two lead to the same sub-block partitioning after split.

When luma and chroma share the same splitting tree, such as the case in inter slices in JEM, split-to-square may or may not be disallowed if a luma block and its associated chroma block have different shapes, such as the case when video content is in 4:2:2 chroma format.

In one embodiment, split-to-square is disallowed if a luma block is square or a luma block's associated chroma blocks are square. In another embodiment, split-to-square is allowed but may lead to different number of sub-blocks for luma and chroma components. For example, for content in 4:2:2 chroma format a 16×16 luma block associates two 8×16 blocks. With split-to-square, the luma block is split into four 8×8 sub-blocks while each chroma block is split into two 8×8 sub-blocks. In another embodiment, split-to-square is allowed based on luma component. Chroma blocks needs to have aligned partitioning to luma block. For example, for content in 4:2:2 chroma format, a 16×16 luma block associates two 8×16 blocks. With split-to-square, the luma block is split into four 8×8 sub-blocks while each chroma block is split into four 4×8 sub-blocks.

In another embodiment, split-to-square is allowed based on chroma component. Luma blocks needs to have aligned partitioning to chroma blocks. For example, for content in 4:2:2 chroma format, a 16×16 luma block associates two (Cb and Cr) 8×16 blocks. With split-to-square, each chroma is split into two 8×8 sub-blocks while the luma block is split into four 8×8 sub-blocks.

According to an embodiment, at the picture boundary, certain tree types may be conditionally disallowed. For example, if a block to be split is vertically outside the picture boundary but not horizontally, vertical splits, such as vertical binary tree and vertical ternary tree, are disallowed for this block. As another example, if a block to be split is horizontally outside the picture boundary but not vertically, horizontal splits, such as horizontal binary tree and horizontal ternary tree, as disallowed for this block.

According to an embodiment, it is proposed to allow different values of width and height for the largest luma block and/or largest chroma block while keeping the smallest luma block as square. The width and height of CTU are signaled in bitstream, such as in SPS, PPS, or slice header. The width of the minimal luma block is signaled in bitstream, such as in SPS, PPS, or slice header. The height of the minimal luma block is inferred the same as the width.

According to an embodiment, it is proposed to give the same priority to split-to-square, BT and TT so that 1) unified tree depth replaces QT depth and BT depth; 2) split-to-square may be at any position, before BT/TT, after BT/TT, or interleaved with BT/TT. At encoder side, all tree types including but not limited to split-to-square, vertical binary tree, horizontal binary tree, vertical ternary tree, and horizontal ternary tree have the same maximal depth and similar searching complexity in general. Consequently, encoder may use multi-threading (one thread for one tree type) to find the best splitting tree in parallel.

As an example, for a 128×128 block, at depth 0, a binary split is used. At depth 1, a binary split and a triple split are employed for top and bottom sub-blocks, respectively. At depth 2, a split-to-square is used to split the 128×32 sub-block into four 32×32 sub-blocks. Finally, at depth 3, a 32×32 block is further split into four 16×16 sub-blocks with split-to-square.

According to an embodiment, it is proposed to always signal the tree type (split type) including picture boundary with a certain tree type binarization table such that certain bins may be derived instead of signaled at picture boundary. As an example, the binarization table may be shown as follows:

| Tree Types | Bin0 | Bin1 | Bin2 | Bin3 |
|---|---|---|---|---|
| Non-split | 0 | | | |
| Split-to-square | 1 | 1 | | |
| Horizontal binary tree | 1 | 0 | 0 | 0 |
| Horizontal ternary tree | 1 | 0 | 0 | 1 |
| Vertical binary tree | 1 | 0 | 1 | 0 |
| Vertical ternary tree | 1 | 0 | 1 | 1 |

The four bins in the table above represent the split type, such as whether to split, whether to split to square, vertical or horizontal, and triple or binary tree, respectively. For a block at the picture boundary and a part of the block is outside the picture, the bin indicating whether split (Bin0 in this embodiment) is not signaled but derived as 1, namely split. Alternatively, the bin indicating vertical or horizontal (Bin2 in this embodiment) is not signaled but derived if 1) the bin indicating split-to-square is 0 (Bin1 in this embodiment), and 2) the block is only vertically or only horizontally outside the picture but not both.

According to an embodiment, it is proposed that the binarization table may depend on other coded information or any other information that is known to both encoder and decoder, including, but not limited to: block area size, block height and/or width, block shape, quantization parameter (QP), luma or chroma component, intra or inter coded, temporal layer, CTU size, block splitting depth. In one example embodiment, several binarization tables may be pre-defined for both encoder and decoder, and the selection may be signaled in slice header, SPS, PPS, VPS or per CTU. In another example embodiment, two binarization tables for the splitting type are pre-defined, if the current block area size is greater than a pre-defined threshold, e.g., 1024, one of the two tables is used for binarizing the split type, otherwise, the other table is used for binarizing the split type.

According to an embodiment, it is proposed to check the parent block split (or partition tree) types and the neighboring split (or partition tree) type when deciding split type and/or direction for the current block. Partitioning duplications due to different splitting orders are disallowed. In one example embodiment, the two splitting orders shown in the figure below lead to the same partitioning. For example, a block is first split with vertical binary tree and then the two sub-blocks are split with horizontal binary tree. Further, a block is first split with horizontal binary tree and then the two sub-blocks are split with vertical binary tree. To avoid duplication, either the $3^{rd}$ splits is disallowed.

In another example, if the parent (last depth) coding or prediction block of the current coding or prediction block is split vertically using ternary tree to three sub-blocks, then the second (or middle) sub-block shall not allow further vertically binary split.

In another example, if the parent (last depth) coding or prediction block of the current coding or prediction block is split horizontally using ternary tree to three sub-blocks, then the second (or middle) sub-block shall not allow further horizontally binary split.

According to an embodiment, it is proposed to indicate the availability of all possibilities of partition traces (a partition trace is how a block is partitioned to a given partition pattern, i.e., the partition type of each depth) in a pre-defined look-up table that is accessible to both encoder and decoder. When deciding whether a split type and/or direction is allowed or signaled, the corresponding partition will be converted to a number and indexed to the pre-defined look-up table, and the availability is given from that look-up table, if the corresponding partition is not available, then the splitting will not be signaled or allowed.

In one example embodiment, the availability of all partition possibilities is stored in terms of CTU, e.g., 64×64, 128×128 or 256×256. In one example embodiment, two partition traces are indexed by m and n, m and n are integer numbers. In a first partition trace, the block is first split as 4 square sub-blocks by quad tree, then each sub-block is further split to 4 square sub-blocks by quad tree. In the second partition trace, the block is first split horizontally as 2 rectangular sub-blocks by binary tree, then each sub-block is further split horizontally as 2 rectangular sub-blocks by binary tree, finally, each sub-block is further split by split-to-square as 4 square blocks. It can be seen that these two partition traces result in the same final partition pattern, therefore, in this example, the right partition trace is marked as unavailable in the look-up table indexed by n, such that the signaling of the bottom rectangular block indicating further partitioning to 4 square blocks is saved.

According to an embodiment, it is proposed to add vertically quad-tree split (VQT) and horizontally quad-tree split (HQT). For example, a 32×32 block can be split into four 8×32 blocks with vertically quad-tree split or split into four 32×8 blocks with horizontally quad-tree split. In another embodiment, vertical QT and horizontal QT are only allowed for intra coded slice.

According to another embodiment, it is proposed to signal a flexible tree flag in the SPS, PPS or slice header to indicate whether the quad split is allowed after a binary split or not. If the flexible tree flag is equal to 1, the quad split is allowed after binary split. If the flexible tree flag is equal to 0, the quad split is not allowed after binary split. A syntax table example of the flexible tree flag in SPS is provided as below. PPS and slice header signaling can follow the similar way.

Although FIG. 1 shows example blocks of an example process, in some implementations, the process may include additional blocks, fewer blocks, different blocks, or differently arranged blocks than those depicted in FIG. 1. Additionally, or alternatively, two or more of the blocks of the process may be performed in parallel.

Figure 2:
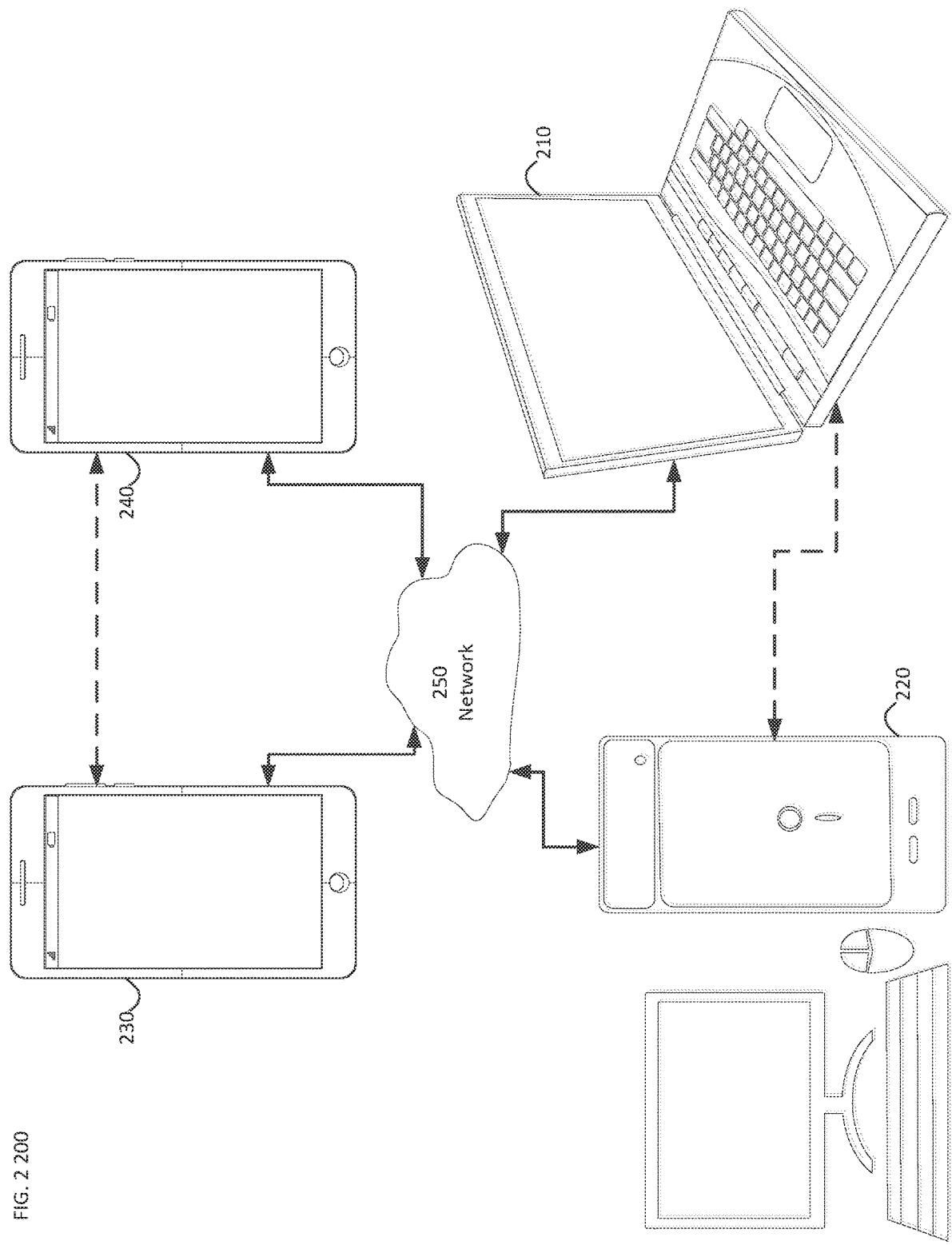
FIG. 2 is a simplified block diagram of a communication system according to an embodiment of the present disclosure.

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
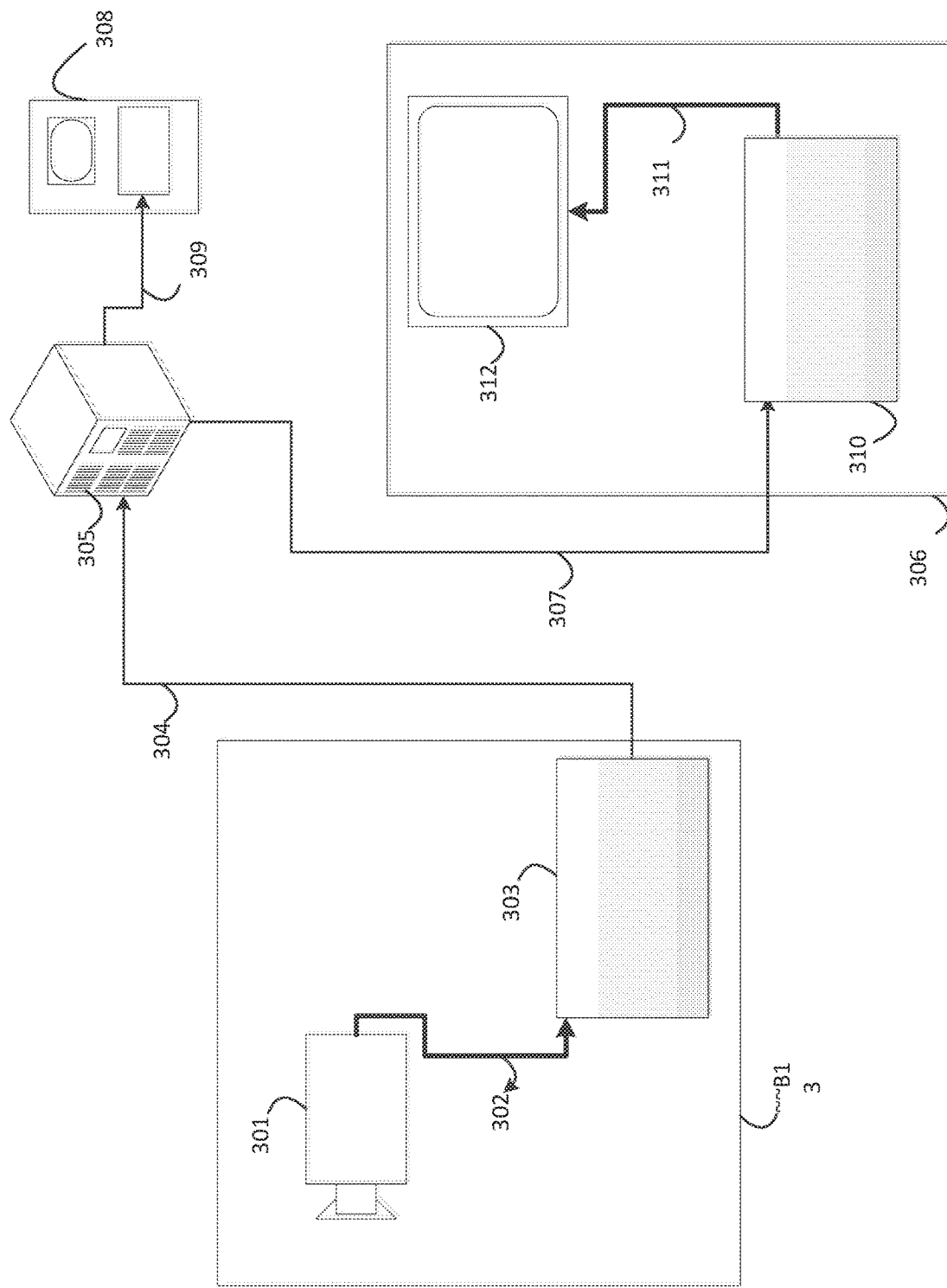
FIG. 3 is a diagram of the placement of a video encoder and decoder in a streaming environment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera 301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 4:
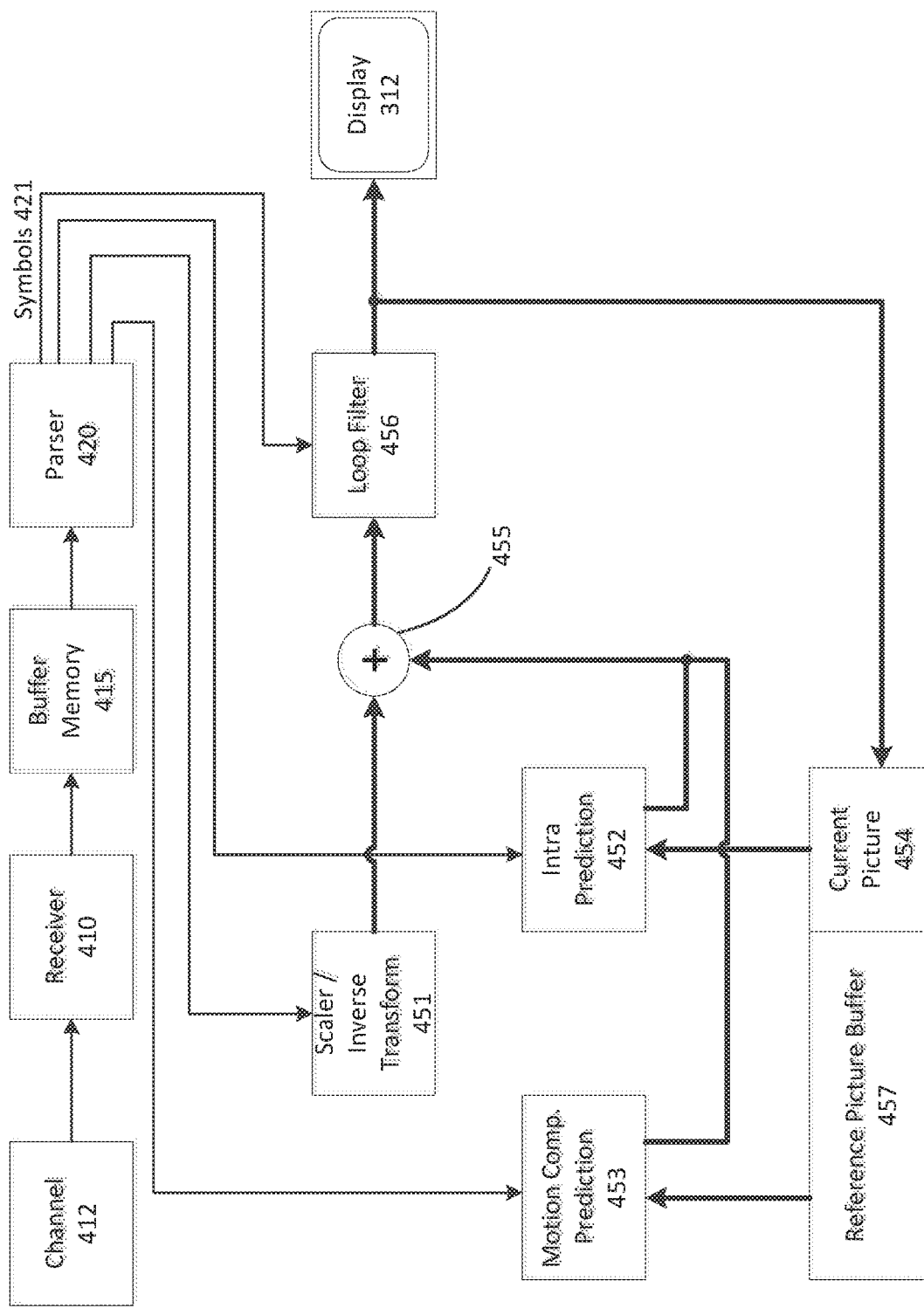
FIG. 4 is a functional block diagram of a video decoder according to an embodiment of the present disclosure.

FIG. 4 may be a functional block diagram of a video decoder (310) according to an embodiment of the present invention.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosynchronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction Unit (452), or a loop filter (456).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (621) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (454). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (656) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
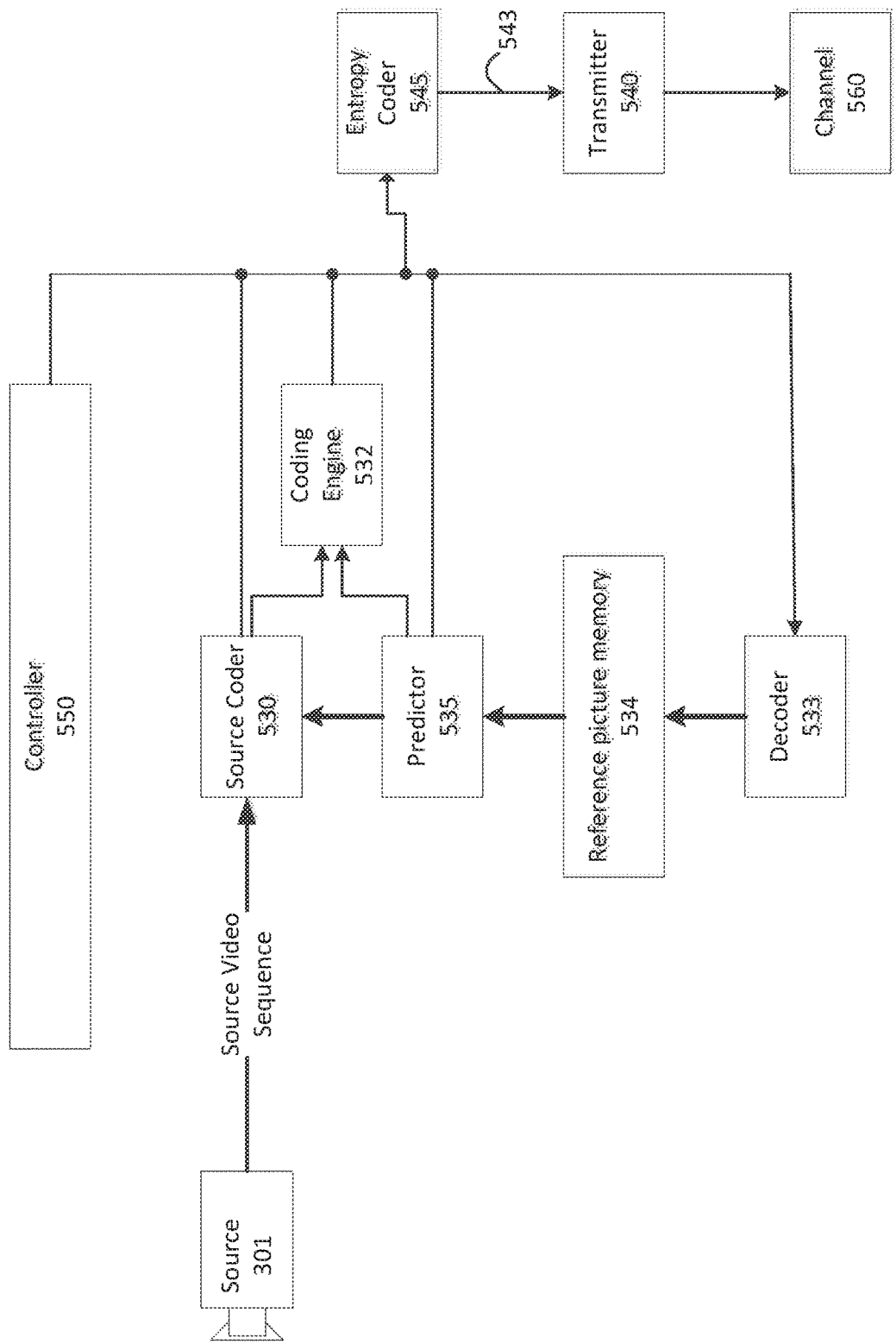
FIG. 5 is a functional block diagram of a video encoder according to an embodiment of the present disclosure.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 5, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block.

Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 6 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
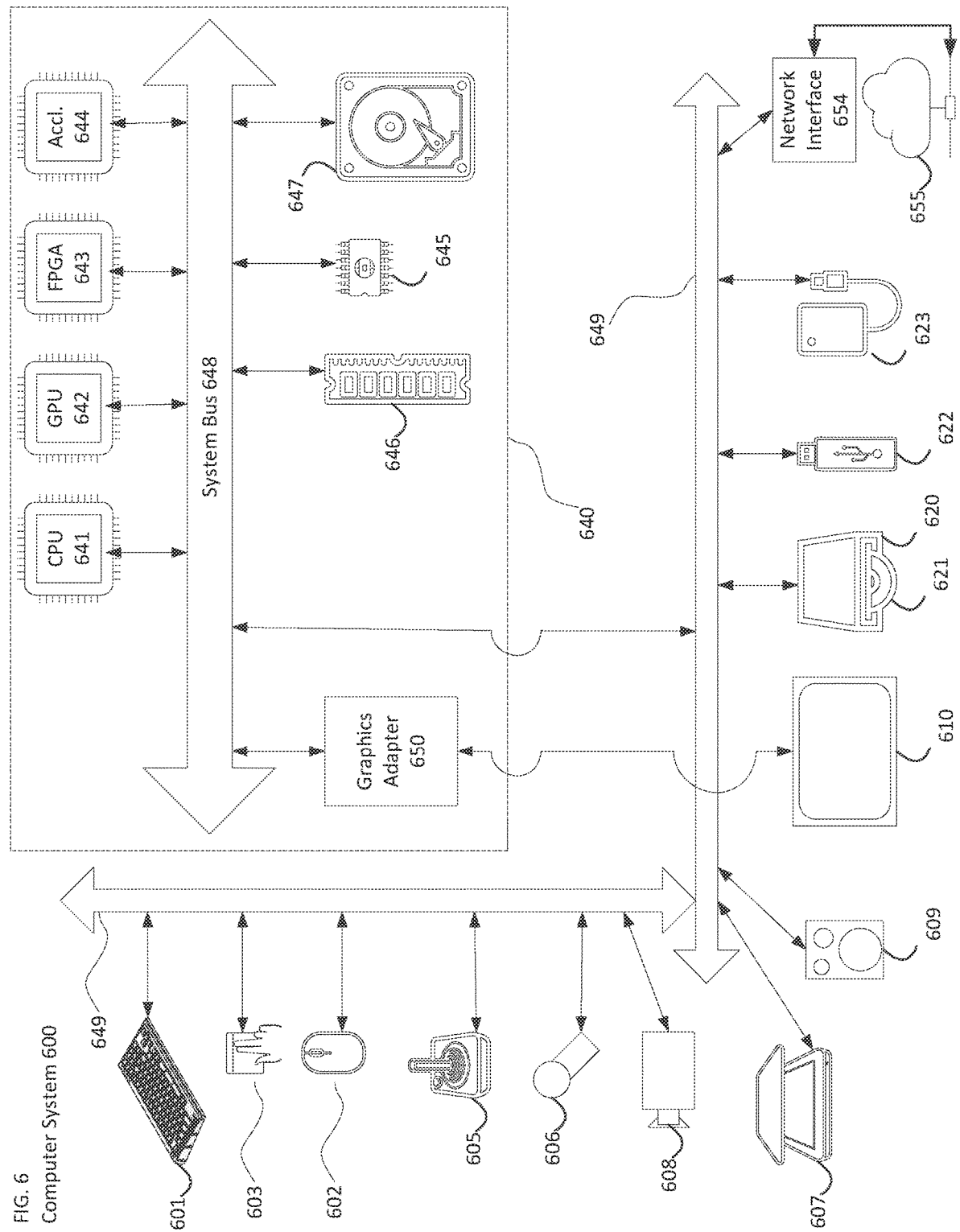
FIG. 6 is a diagram of a computer system in accordance with an embodiment.

The components shown in FIG. 6 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove 1204, joystick 605, microphone 606, scanner 607, camera 608.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data-glove 1204, or joystick 605, but there can also be tactile feedback devices that do not serve as input devices), audio output devices (such as: speakers 609, headphones (not depicted)), visual output devices (such as screens 610 to include cathode ray tube (CRT) screens, liquid-crystal display (LCD) screens, plasma screens, organic light-emitting diode (OLED) screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example universal serial bus (USB) ports of the computer system 1200; others are commonly integrated into the core of the computer system 1200 by attachment to a system bus as described below (for example Ethernet interface into a PC computer system or cellular network interface into a smartphone computer system). Using any of these networks, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 640 of the computer system 1200.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory (RAM) 646, internal mass storage such as internal non-user accessible hard drives, solid-state drives (SSDs), and the like 647, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 649. Architectures for a peripheral bus include peripheral component interconnect (PCI), USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 7:
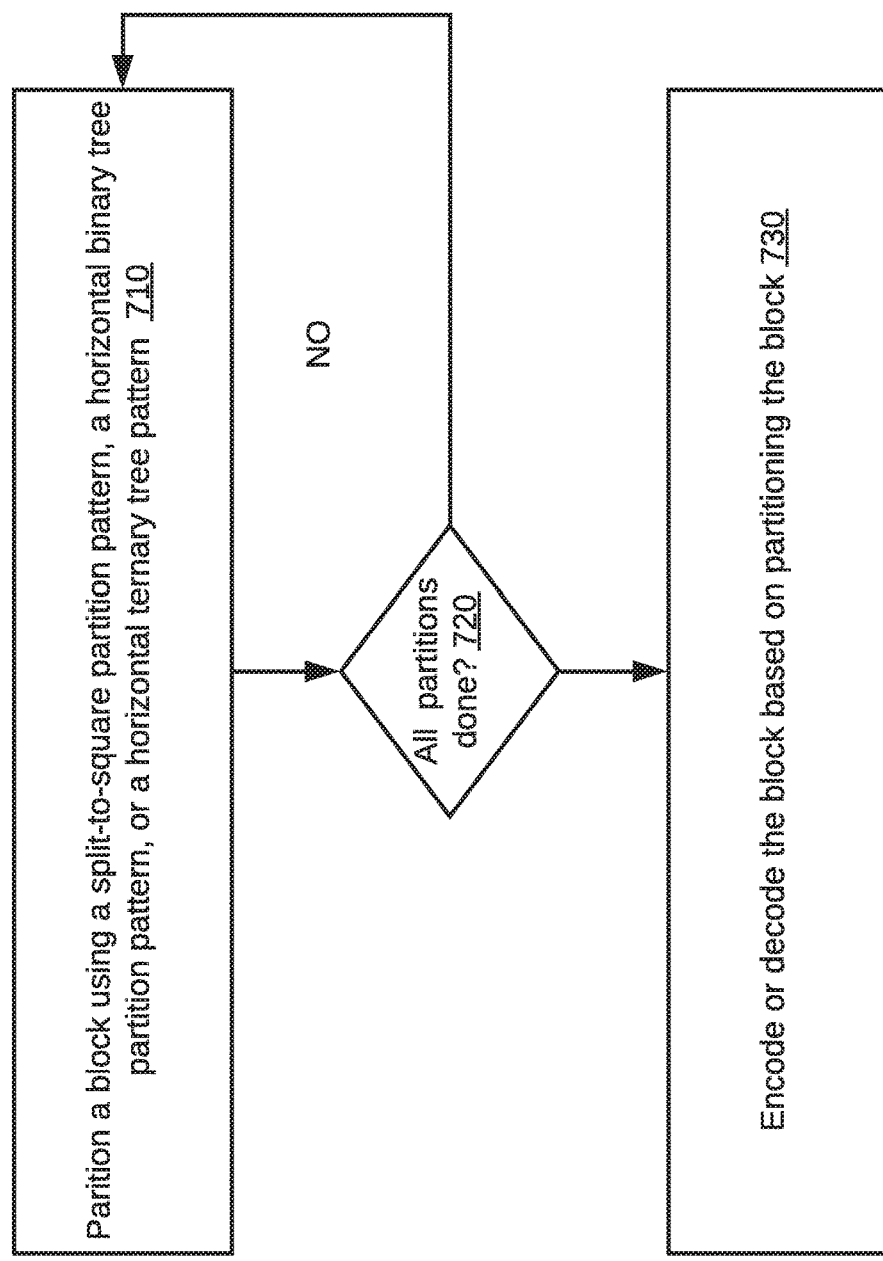
FIG. 7 is a flowchart of an example process for partitioning a block using a unified tree depth to generate a set of sub-blocks.

FIG. 7 is a flowchart of an example process for partitioning a block using a unified tree depth to generate a set of sub-blocks.

As shown in FIG. 7, the example process may include partitioning the block using a split-to-square partition pattern, a horizontal binary tree partition pattern, or a horizontal ternary tree partition pattern to generate a set of sub-blocks (block 710). A same priority is allocated to the split-to-square partition pattern, the horizontal binary tree partition pattern, and the horizontal ternary tree partition pattern such that the split-to-square partition pattern may be used before, after, or interleaved with the horizontal binary tree partition pattern and the horizontal ternary tree partition pattern.

As further shown in FIG. 7, the process may include determining whether another partition is to be performed (block 720).

If another partition is to be performed (block 720—YES), then the process may return to block 710. Otherwise, as further shown in FIG. 7, the example process may include encoding or decoding the video sequence based on partitioning the block using the split-to-square partition pattern, the horizontal binary tree partition pattern, or the horizontal ternary tree partition pattern (block 730).

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for partitioning a block to permit the decoding of a video sequence, the method comprising:
    determining a first bin being indicative of partitioning the block using a split-to-square partition pattern;
    in response to determining the first bin indicating to partition the block using a split-to-square partition pattern, partitioning the bock using a split-to-square partition pattern;
    in response to determining a second bin indicating horizontally or vertically split at least part of the block, partitioning at least one sub-block using a horizontal or vertical tree partition pattern; and
    in response to determining a third bin indicative of using binary or ternary tree partition pattern, partitioning the at least one sub-block using a horizontal binary tree partition pattern or a horizontal ternary tree partition pattern to generate a set plurality of sub-blocks, wherein the split-to-square partition pattern may be used before the binary tree partition pattern and the ternary tree partition pattern; and decoding the video sequence based on partitioning the block using the split-to-square partition pattern, the horizontal binary tree partition pattern, or the horizontal ternary tree partition pattern.

2. The method of claim 1, wherein a maximum number of sub-blocks is four, eight, or sixteen.

3. The method of claim 1, further comprising:
determining that the block is located vertically outside of a picture boundary, and is located horizontally inside of the picture boundary; and
preventing a partition using a vertical split partition pattern.

4. The method of claim 1, further comprising:
determining that the block is located horizontally outside of the picture boundary, and is located vertically inside of the picture boundary; and
preventing a partition using a horizontal split partition pattern.

5. The method of claim 1, further comprising:
partitioning at least one sub-block of the set of sub-blocks using a horizontal binary tree partition pattern based on partitioning the block using the split-to-square partition pattern.

6. The method of claim 1, further comprising:
partitioning at least one sub-block of the set of sub-blocks using a horizontal triple tree partition pattern based on partitioning the block using the split-to-square partition pattern.

7. The method of claim 1, further comprising:
partitioning at least one sub-block using a vertically quad-tree split (VQT) partition pattern.

8. The method of claim 1, further comprising:
partitioning at least one sub-block using a horizontally quad-tree split (HQT) partition pattern.

9. The method of claim 1, further comprising:
identifying a maximum number of the sub-blocks based on predetermined information.

10. The method of claim 1, further comprising:
identifying a maximum number of the sub-blocks based on signaling information.

11. A device for partitioning a block to permit the decoding of a video sequence, comprising:
at least one memory configured to store program code; and
at least one processor configured to read the program code and operate as instructed by the program code, the program code including:
determining code configured to cause the at least one processor to determine a first bin being indicative of partitioning the block using a split-to-square partitioning pattern; and
partitioning code configured to cause the at least one processor to, in response to determining the first bin indicating to partition the block using a split-to-square partition pattern, partition the block using a split-to-square partition pattern, in response to determining a second bin indicating horizontally or vertically split at least part of the block, partition at least one sub-block using a horizontal or vertical tree partition pattern, and in response to determining a third bin indicative of using binary or ternary tree partition pattern, partition the at least one sub-block using a horizontal binary tree partition pattern or a horizontal ternary tree partition pattern to generate a set of plurality of sub-blocks, wherein the split-to-square partition pattern may be used before the binary tree partition pattern and the ternary tree partition pattern; and
decoding code configured to cause the at least one processor to decode the video sequence based on partitioning the block using the split-to-square partition pattern, the horizontal binary tree partition patterns, or the horizontal ternary tree partition pattern.

12. The device of claim 11, wherein a maximum number of sub-blocks is four, eight, or sixteen.

13. The device of claim 11, further comprising:
determining code configured to cause the at least one processor to determine that the block is located vertically outside of a picture boundary, and is located horizontally inside of the picture boundary; and
preventing code configured to cause the at least one processor to prevent a partition using a vertical split partition pattern.

14. The device of claim 11, further comprising:
determining code configured to cause the at least one processor to determine that the block is located horizontally outside of the picture boundary, and is located vertically inside of the picture boundary; and
preventing code configured to cause the at least one processor to prevent a partition using a horizontal split partition pattern.

15. The device of claim 11, wherein the partitioning code is further configured to cause the at least one processor to partition at least one sub-block of the set of sub-blocks using a horizontal binary tree partition pattern based on partitioning the block using the split-to-square partition pattern.

16. The device of claim 11, wherein the partitioning code is further configured to cause the at least one processor to partition at least one sub-block of the set of sub-blocks using a horizontal triple tree partition pattern based on partitioning the block using the split-to-square partition pattern.

17. The device of claim 11, wherein the partitioning code is further configured to cause the at least one processor to partition at least one sub-block using a vertically quad-tree split (VQT) partition pattern.

18. The device of claim 11, wherein the partitioning code is further configured to cause the at least one processor to partition at least one sub-block using a horizontally quad-tree split (HQT) partition pattern.

19. The device of claim 11, further comprising:
identifying code configured to cause the at least one processor to identify a maximum number of the sub-blocks based on predetermined information.

20. A non-transitory computer-readable medium storing instructions, the instructions comprising: one or more instructions that, when executed by one or more processors of a device for partitioning a block to permit the encoding or decoding of a video sequence, cause the one or more processors to:
determine a first bin being indicative of partitioning the block using a split-to-square partition pattern;
in response to determining the first bin indicating to partition the block using a split-to-square partition pattern, partition the block using a split-to-square partition pattern;
in response to determining a second bin indicating horizontally or vertically split at least part of the block, partition at least one sub-block using a horizontal or vertical tree partition pattern;
in response to determining a third bin indicative of using binary or ternary tree partition pattern, partition the at least one sub-block using a horizontal binary tree partition pattern or a horizontal ternary tree partition pattern to generate a set plurality of sub-blocks, wherein the split-to-square partition pattern may be used before the binary tree partition pattern and the ternary tree partition pattern; and decode the video sequence based on partitioning the block using the split-to-square partition pattern, the horizontal binary tree partition pattern, or the horizontal ternary tree partition pattern.

* * * * *